United States Patent
Minamizawa

(10) Patent No.: US 6,208,434 B1
(45) Date of Patent: Mar. 27, 2001

(54) COPYING APPARATUS IN A FACSIMILE MACHINE

(75) Inventor: Fumihiro Minamizawa, Toyoake (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/023,115

(22) Filed: Feb. 13, 1998

(30) Foreign Application Priority Data

Feb. 27, 1997 (JP) .................................................. 9-044062

(51) Int. Cl.[7] ...................................................... H04N 1/32
(52) U.S. Cl. ........................ 358/468; 358/401; 358/404; 358/1.14; 358/1.15
(58) Field of Search ................................. 358/401, 404, 358/429, 444, 448, 449, 451, 455, 456, 457, 468, 462, 467; 395/109, 114, 115; 382/232, 237, 252; 399/83, 84

(56) References Cited

U.S. PATENT DOCUMENTS

| | | | |
|---|---|---|---|
| 4,791,492 | * 12/1988 | Nagashima et al. | 358/409 |
| 4,809,041 | * 2/1989 | Funada | 399/82 |
| 5,245,444 | * 9/1993 | Hashimoto | 358/448 |
| 5,668,637 | * 9/1997 | Yamaguchi | 358/296 |
| 5,778,159 | * 7/1998 | Ito | 395/109 |

FOREIGN PATENT DOCUMENTS 5-308531  11/1993 (JP) .

* cited by examiner

Primary Examiner—Edward Coles
Assistant Examiner—Mark Wallerson
(74) Attorney, Agent, or Firm—Oliff & Berridge, PLC

(57) ABSTRACT

This invention permits copying of multiple documents when only a small amount of memory is available. When a single copy mode is selected from an operator panel, a document's color image is read by the scanner section, stored line-by-line in a buffer, color corrected, converted to binary print-use data using the error diffusion method, and printed on a line-by-line basis by a recording section. When a multiple copy mode is selected, one line of a read color image is subjected to color correction and data-compressed using a simple binary conversion into print-use data, so that one line of obtained image data is compressed before being stored in the copy-use storage area. When the image data on one sheet has been processed and stored, printing is performed by a recording section.

12 Claims, 10 Drawing Sheets

COPYING APPARATUS IN A FACSIMILE MACHINE

BACKGROUND OF THE INVENTION

1. Field of Invention

The invention relates to a copying apparatus which reads an image from a document, converts it into print-use data, and forms the image on a recording medium in accordance with the print-use data.

2. Description of Related Art

Normally, facsimiles are provided with the finction to copy and output an image formed on a document. To copy a document image to paper, first, in the same way as at document transmission, the image is read into memory as electronic data line-by-line by a scanner. Next, in the same way as at image reception, the image data is read from the memory and recorded onto paper by a recording section. Since this method requires memory for storing only one line of data for copying, it contributes to a reduction in memory capacity.

Meanwhile, in the case of a multiple copy operation for obtaining a plurality of copies from an identical document, accumulating all of the image data for the document in memory would eliminate the need for repeated reading by the scanner because the accumulated data can be used to repeat the recordation onto paper. As a result, processing for obtaining a plurality of copies could be sped up.

However, to obtain a plurality of copies, a large memory is required because all of the image data on the document must be stored in the memory. Accordingly, when the facsimile has large quantities of data for transmission in the memory, not all of the image data of a document for copying can be stored in the memory. Consequently, the multiple copy function as described above may not be executed. In addition, it is undesirable to provide a large memory only for the purpose of obtaining a plurality of copies, since this function will increase the cost of the facsimile.

SUMMARY OF THE INVENTION

An object of the invention is to provide a copying apparatus which permits execution of memory-intensive functions, such as the multiple copy function, even when there is only a small amount of available memory.

According to the copying apparatus of the invention, a conversion-type selection unit, in accordance with a memory capacity required by the copy mode specified in command input unit, classifies the copy mode into a plurality of groups. For the copy mode of groups requiring more memory, the conversion type selection unit selects a conversion type which makes the amount of the print-use data smaller.

For example, if the multiple copy mode is specified as the copy mode of groups requiring a large amount of memory, a conversion-type which makes the amount of the print-use data smaller is selected. Therefore, the multiple copy operation will never fail because of memory shortage.

Conversely, in the copy mode of groups requiring a small amount of memory, such as a single copy mode in which one copy is obtained per document sheet, a conversion type which makes the amount of the print-use data larger is selected. However, since such a copy mode uses a small amount of memory by nature and may consume no memory except buffer memory, memory shortage will not occur. Therefore, a conversion type which makes the amount of the print-use data larger can be used, so that copies with excellent image quality can be obtained.

Moreover, by providing a unit for compressing data, print-use data resulting from conversion by the image data converter can be compressed as required before being stored. In this case, the conversion-type selection unit, in accordance with a memory amount required by the copy mode specified in the command input unit, classifies the copy mode into a plurality of groups. For the copy mode of groups requiring more memory, the conversion type selection unit selects a conversion type which would provide a greater compression effect if the data is compressed.

Thus, since a conversion type which provides a greater compression effect is used for the copy mode of groups requiring more memory, the situation in which copying becomes impossible because of memory shortage is prevented.

Conversely, for the copy mode of groups requiring a smaller amount of memory, a difficult-to-compress conversion type is selected as the type of conversion into print-use data. However, such a difficult-to-compress conversion type generally produces high-quality images during recording, so that copies of high-quality images can be obtained.

Furthermore, a residual memory amount detection unit can also be provided for detecting the amount of residual memory available for storing print-use data. In this case, when a larger amount of residual memory is detected by the residual memory amount detection unit, the conversion-type selection unit can select a conversion type which makes the amount of the print-use data larger, so that copies with excellent image quality can be output by making the most efficient use of memory for each copy mode.

When a smaller amount of residual memory is detected, a conversion type which makes the amount of the print-use data smaller is selected, so that the situation in which copying becomes impossible because of memory shortage is prevented.

Likewise, by providing a residual memory amount detection unit for detecting the amount of residual memory available for storing print-use data, when a larger residual amount of memory is detected by the memory residual amount detection unit, the conversion-type selection unit may also be configured so as to select a conversion type which would provide a smaller compression effect if the data is compressed, so that the same effect as described above is obtained for each copy mode.

The existence of available memory becomes problematic in groups requiring more memory than those of the selected copy mode. When a larger amount of residual memory is detected by the residual memory amount detection unit in groups requiring more memory than those of the selected copy mode, the conversion type selection unit selects a conversion type which makes the amount of the print-use data larger.

Likewise, when a larger residual amount of memory is detected by the memory residual amount detection unit in groups requiring more memory than those of the selected copy mode, the conversion-type selection unit selects a conversion type which would provide a smaller effect for the compression of the print-use data.

The unit for inputting the copy mode which is provided in the configuration described above is not always required. That is, when a larger amount of residual memory is detected by the residual memory amount detection unit, the conversion type selection unit may also be configured so as to select a conversion type which makes the amount of the print-use data larger.

If a conversion unit such as described above is provided, when a larger residual amount of memory is detected by the residual memory amount detection unit, the conversion-type selection unit may also be configured so as to select a conversion type which would provide a smaller compression effect if the data is compressed.

In a copying apparatus having a size detection unit for detecting the size of a document, a document image is read from a range corresponding to a size detected by the size detection unit and is converted it into print-use data. A copying unit then forms an image on a recording medium using the print-use data. When a larger document size is detected by the size detection unit, the conversion-type selection unit may also be configured so as to select a conversion type which makes the amount of the print-use data smaller, so that the same effect as described above is obtained.

In this case, since the amount of memory required for storage depends on the size of the document to be read, copies with an excellent image quality can be output by making the most efficient use of memory.

Likewise, when a larger document size is detected by the size detection unit, the conversion type selection unit may also be configured so as to select a conversion type which would provide a greater data compression effect, so that the same effect as described above is obtained.

Copy modes include a single copy mode and a multiple copy mode. In the single copy mode, an image is formed on a recording medium only once per document sheet. The multiple copy mode requires more memory than the single copy mode because an image is being formed on a recording medium more than once per document sheet.

The multiple copy mode not only includes a mode in which more than one copy is obtained per document sheet, but also includes a sort copy mode in which, when a plurality of document sets comprising a plurality of sheets is copied, images are formed on the recording media for each set.

As a conversion type, there can be provided a combination of a multivalue conversion type generally used to copy photos and a binary conversion type which makes the amount of data smaller than the multivalue conversion type (simple binary conversion type or binary conversion type by halftone processing).

As another conversion type, there can be provided a combination of the simple binary conversion type and the binary conversion type by halftone processing which provides a smaller compression effect than the simple binary conversion type.

As a still further conversion type, there can be provided a combination of the three conversion types: multivalue conversion, simple binary conversion, and binary conversion by halftone processing.

To implement such a copying apparatus in a computer system, programs for the computer system are provided. These programs are stored on machine-readable recording media, such as floppy disks, optical disks, CD-ROM, hard disks, etc., and can be loaded into the computer system and used as required. In addition, with programs stored in ROM and backup RAM, the ROM or backup RAM can be included in the computer system.

BRIEF DESCRIPTION OF THE DRAWINGS

The preferred embodiments of the invention will be described in detail with reference to the following figures wherein.

DETAILED DESCRIPTION OF PREFERRED EMBODIMENTS

First embodiment

Figure 1A:
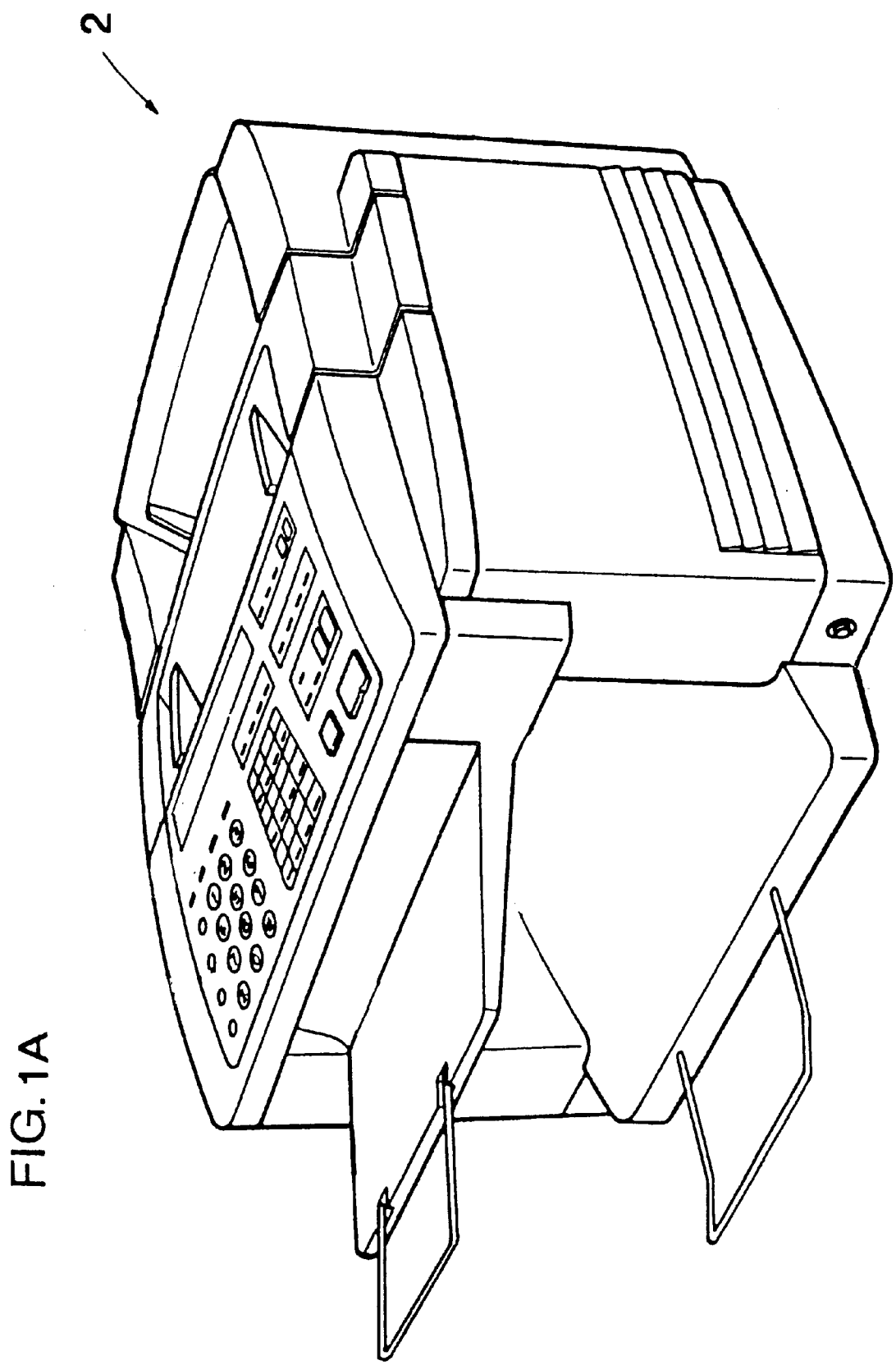
FIG. 1A is an illustration of a facsimile machine which may be used with the invention.
Figure 1B:
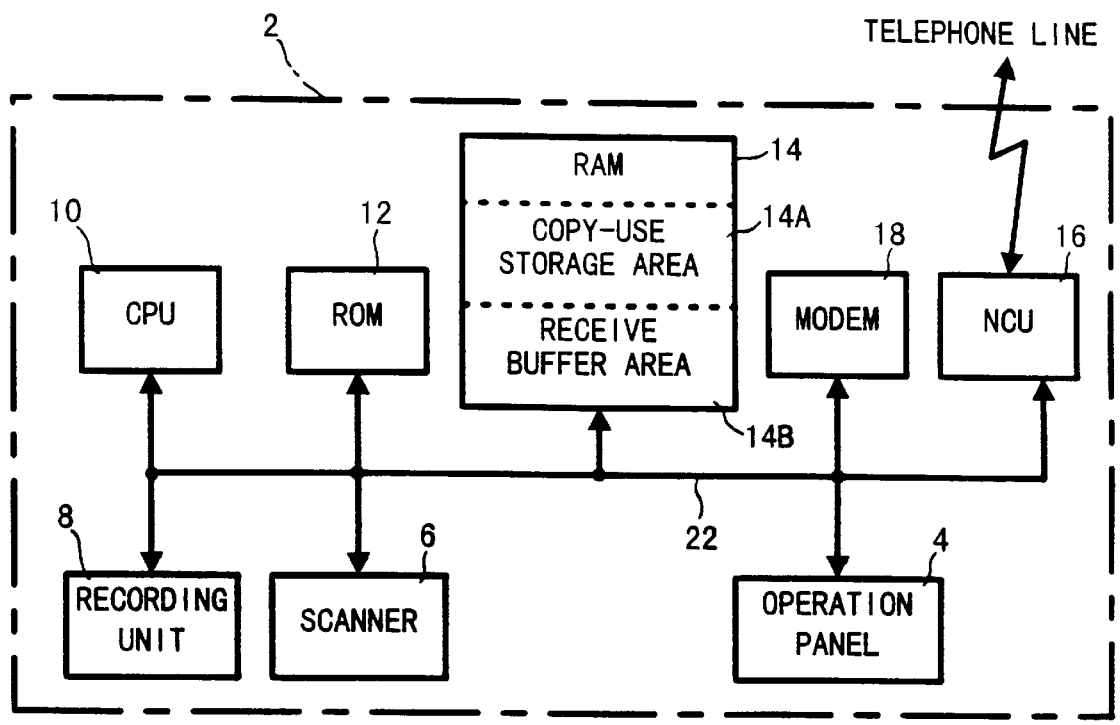
FIG. 1B is a block diagram showing a configuration of a facsimile of the first embodiment.

FIG. 1A is an illustration of an exemplary facsimile 2 which may be used with the invention. FIG. 1B is a block diagram showing a configuration of the exemplary facsimile 2 having a color copying apparatus function to which the invention is applied.

The facsimile 2 performs common facsimile functions in response to a command entered from a user via operator panel 4, such as setting the operation mode, reading of a document image by the scanner section 6, coding transmission data, sending and receiving facsimile data, decoding received data, and recording decoded facsimile data onto paper in the recording section 8. The facsimile 2 also performs color copy apparatus functions, such as recording a color document image read by the scanner 6 onto paper in the recording section 8.

The facsimile 2 comprises CPU 10, ROM 12, RAM 14, part of which is used as a copy-use storage area 14A and a receive buffer area 14B, a network controller unit (NCU) 16 for permitting dialog and facsimile data exchange with other telephones and facsimiles, a modem 18 for sending and receiving facsimile data to and from other facsimiles via the NCU 16, and a bus line 22 for connecting these components. A telephone receiver, a speaker, and the like, are also provided though not shown in the figure, so that communication with other telephones can be made possible.

Figure 2:
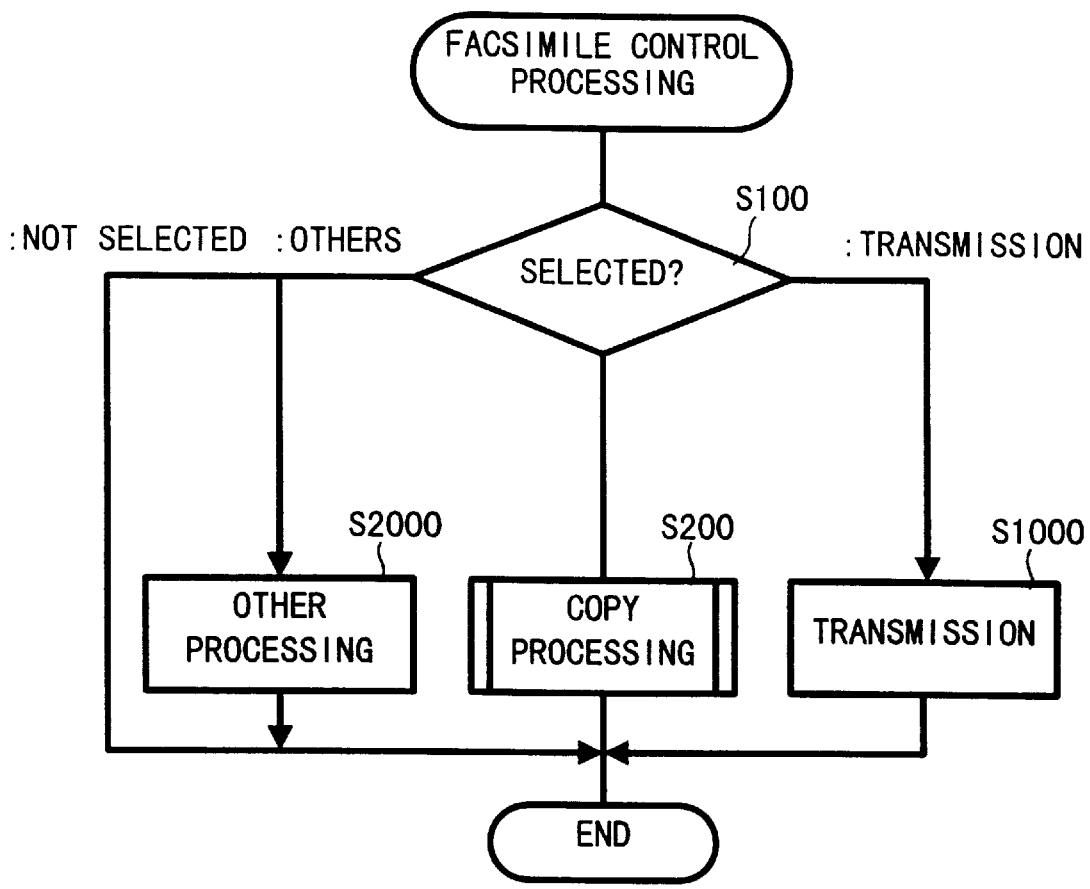
FIG. 2 is a flowchart showing facsimile control processing of the first embodiment.

Facsimile control processing performed by the facsimile 2 is shown in the flowchart of FIG. 2. When the facsimile control process begins, the operator panel 4 is checked for selections (S100). If no selection is found, the process terminates. If a selection is made, copy processing (S200), transmission processing (S1000), or other processing (S2000) is performed accordingly.

Figure 3:
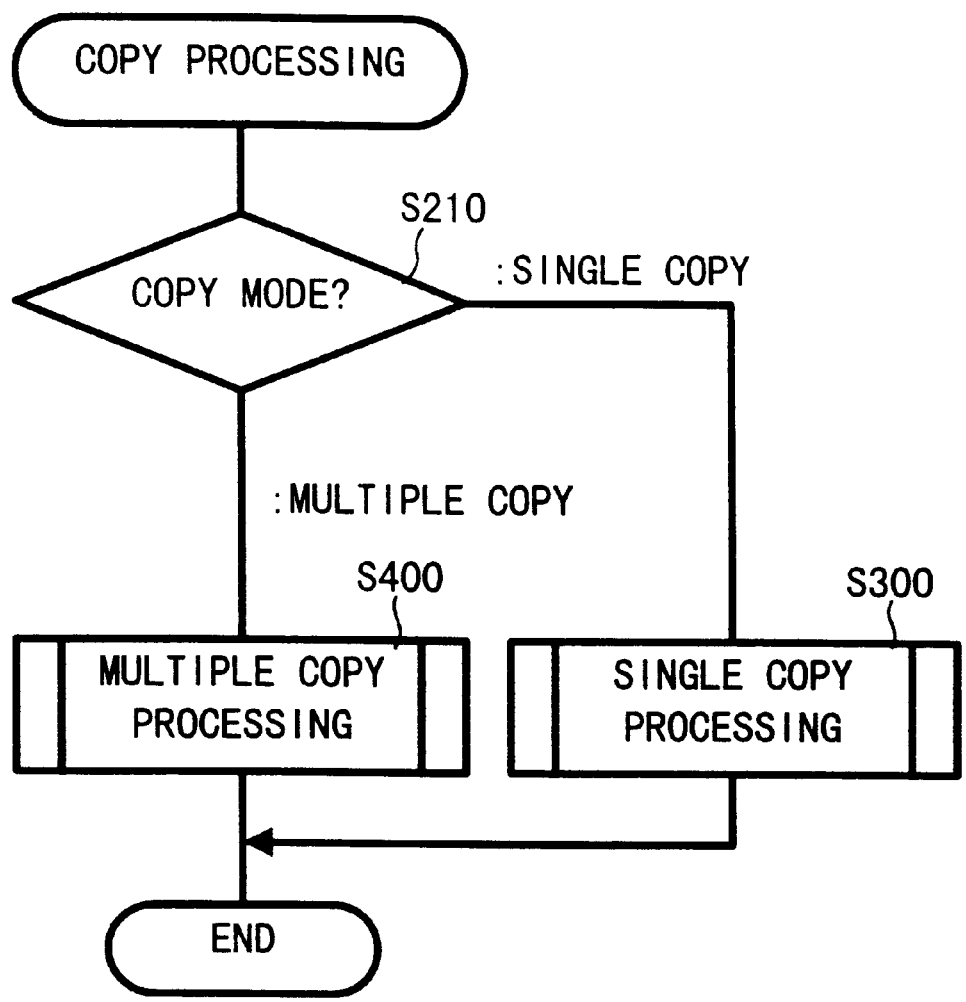
FIG. 3 is a flowchart showing copy processing of the first embodiment.

If copy processing (S200) is selected, the copy process shown in the flowchart of FIG. 3 is performed. The copy mode is determined (S210) based on the operation selected on the operator panel 4. If the single copy mode is selected, the single copy process (S300) shown in FIG. 4 is performed, and if the multiple copy mode is selected, the multiple copy process (S400) shown in FIG. 5 is performed.

Figure 4:
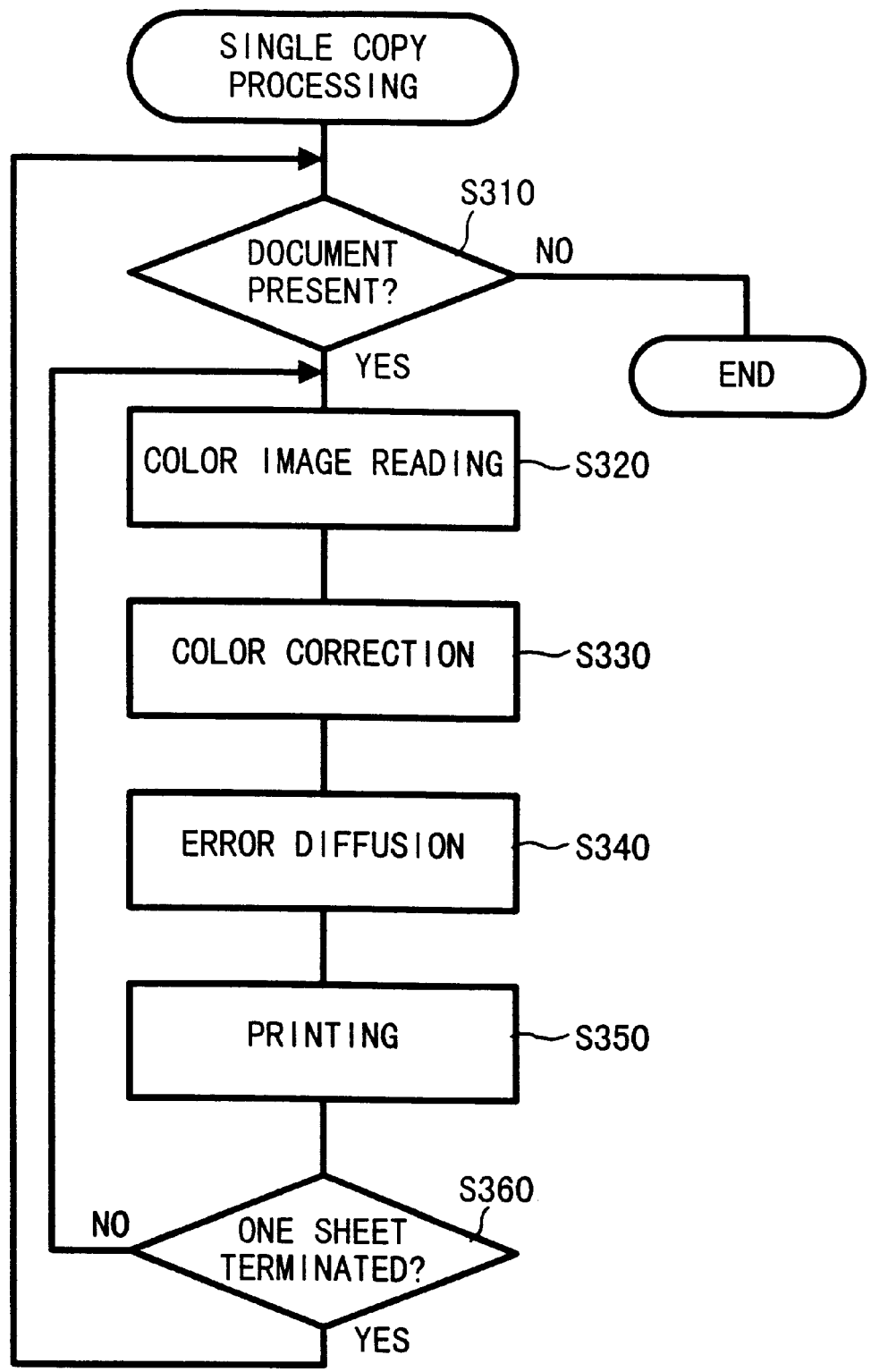
FIG. 4 is a flowchart showing single copy processing of the first embodiment.
Figure 5:
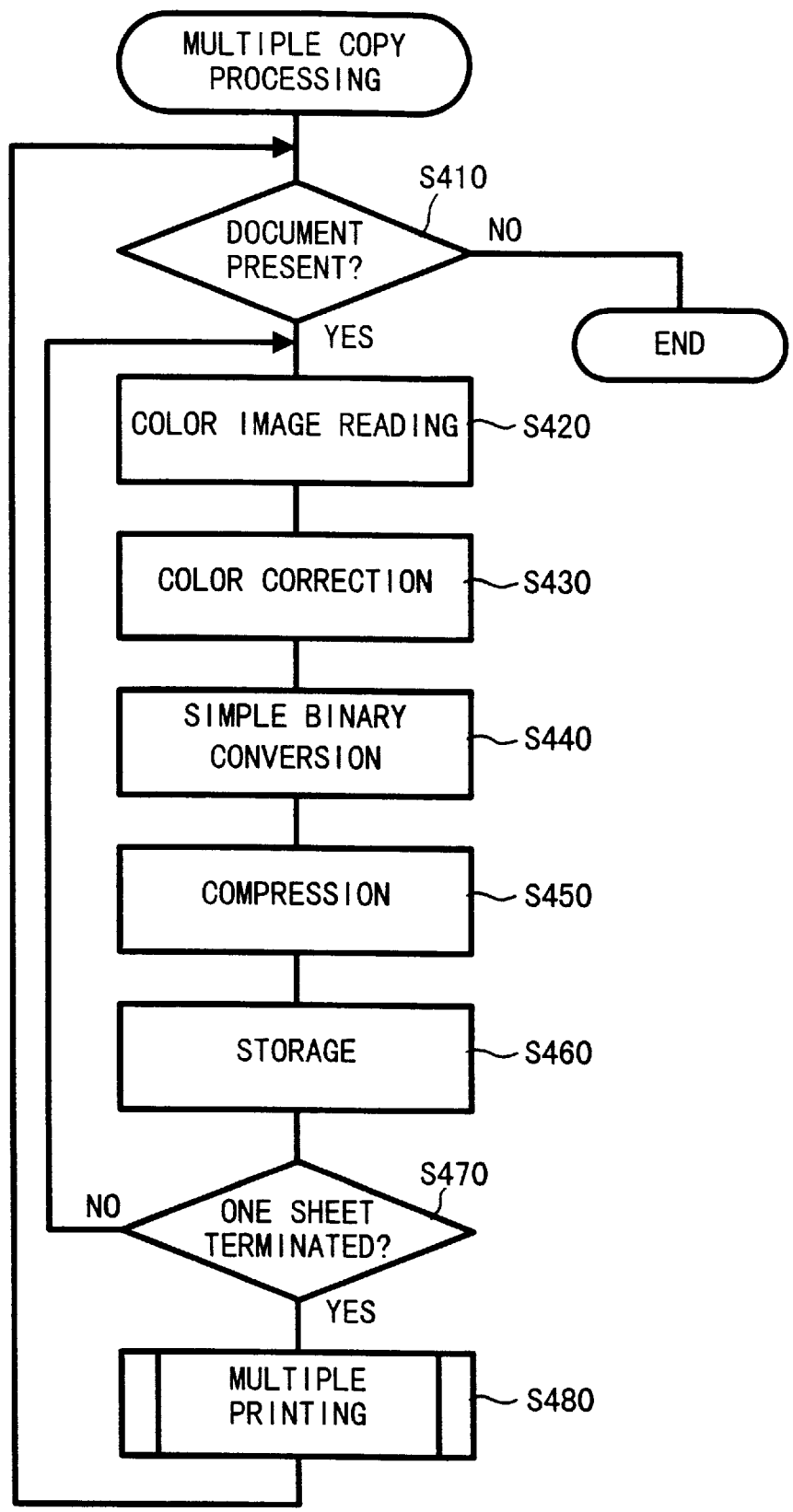
FIG. 5 is a flowchart showing multiple copy processing of the first embodiment.

In FIG. 4, if the single copy mode is selected, the process first determines whether a document is present on a document tray (not shown) (S310). If a document is not present (S310: NO), the copy process is terminated.

If a document is present on the document tray (S310: YES), the document's color image (or black and white) is read by the scanner section 6 and stored in a one-line buffer (S320). Next, color correction, such as γ correction and shading correction, is performed for one line of the stored color image (S330). A multivalue halftone image obtained by the correction is converted into a binary pseudo-halftone image by the error diffusion method (S340).

One line of image data obtained by this method is recorded on paper as a color image by using four color inks, C (cyan), magenta (M), Y (yellow), and K (black), in the recording section 8 (S350).

Next, the process determines whether all of the image data on one document sheet has been copied (S360). If not all of the image data has been copied (S360: NO), steps S320 to S350 are performed again and the next line is processed and printed. In the course of processing, the document to be read is moved gradually from the document tray (not shown) to a document ejection tray. Once the document has been read, it is ejected to the document ejection tray. At almost the same time as the reading of the document is completed, a copy of the document is ejected to a recording paper ejection tray.

When all of the image data on one sheet has been copied (S360: YES), the step S310 is executed again to determine whether another document exists on the document tray. If another document exists (S310: YES), the process described above is repeated. When copying is completed for all desired documents (S310: NO), the copy processing terminates.

In FIG. 5, if the multiple copy mode is selected, the process first determines whether a document is present on the document tray (S410). If a document is not present (S410: NO), the copy process terminates.

If a document is present on the document tray (S410: YES), the document's color image read by the scanner section 6 and is stored in a one-line buffer (S420). Next, color correction, such as γ correction and shading correction, is performed for one line of the stored color image (S430). A multivalue halftone image obtained by the correction is subjected to a simple binary conversion process by which "1" is set for a concentration larger than a predetermined threshold, and "0" is set for a concentration smaller than the threshold. Thus, the color image is converted into a binary image (S440).

One line of binary image data obtained in this way is compressed by a predetermined compression technique (S450) and stored in the copy-use storage area 14A of RAM 14 (S460).

Next, the process determines whether all of the image data on one document sheet has been processed or stored (S470). If all of the image data has not been processed or stored (S470: NO), the steps S420 to S460 are performed again and the image data of the next line is stored in the copy-use storage area 14A. In the course of the process, the document to be read is moved gradually from the document tray to a document ejection tray. Once the document has been read, it is ejected to a document ejection tray. When all of the image data of one document sheet has been stored (S470: YES), multiple print processing is performed (S480).

Figure 6:
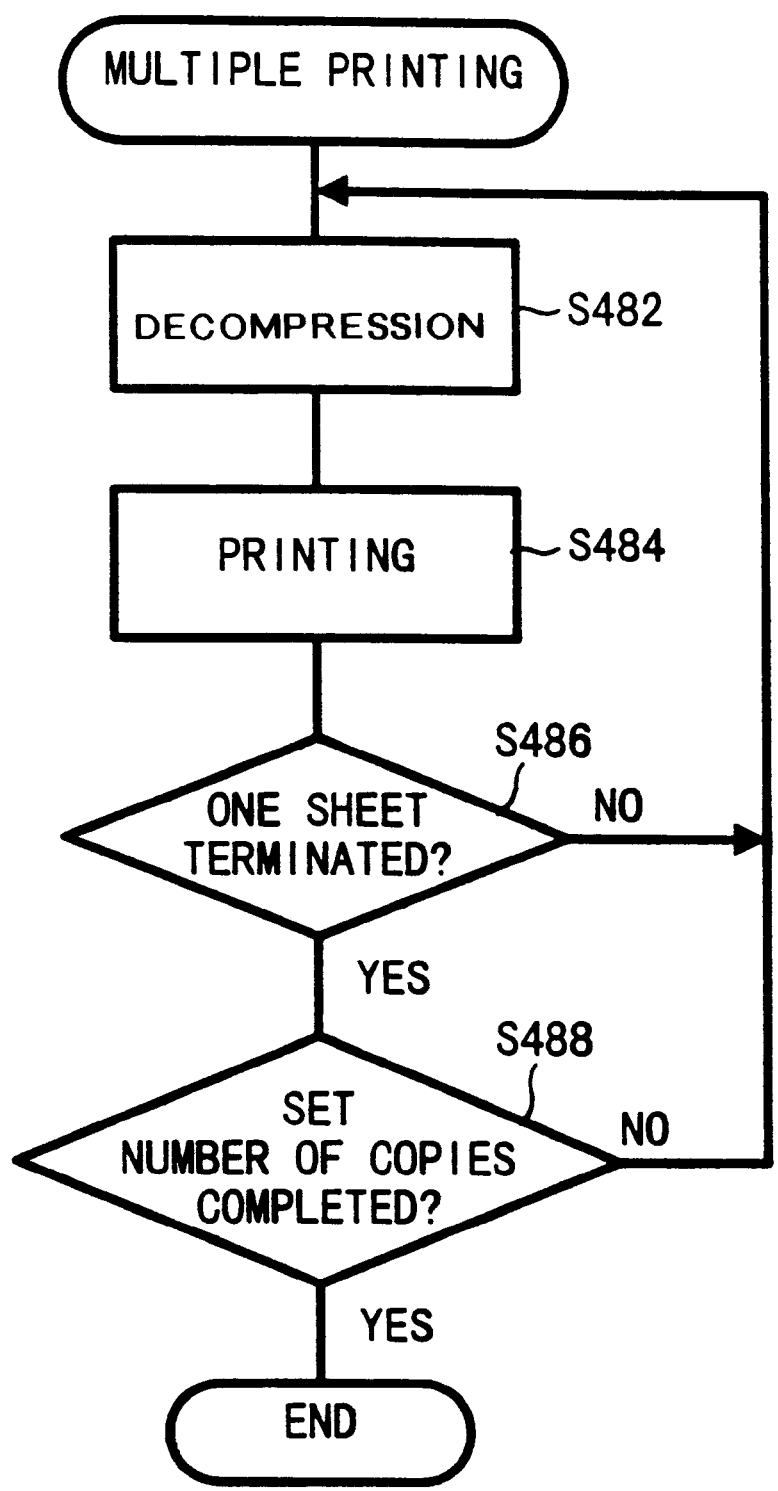
FIG. 6 is a flowchart showing multiple print processing of the first embodiment.

The multiple print processing (S480) is performed as shown in FIG. 6. First, the document image data stored in a compressed form in the copy-use storage area 14A is read sequentially from the beginning and decompressed (or expanded) (S482). The decompressed data is output to the recording section 8 and printed onto paper in color (S484).

The process then determines whether all of the image data on one document sheet has been printed (S486). If all of the image data has not been printed (S486: NO), the steps S482 to S484 are repeated and printing continues. If all of the image data on one document sheet has been printed (S486: YES), the process then determines whether the number of desired copies entered from the operator panel 4 during selection of multiple copy mode have been printed (S488). If all of the copies have not been printed (S488: NO), the identical document image data is again read sequentially from the copy-use storage area 14A and steps S482, S484, and S486 are repeated. If the set number of copies has been printed (S488: YES), the copies are output to the paper ejection tray and step S410 is executed again.

If another document is present on the document tray (S410), steps S420 to S480 are again performed for the document until the set number of copies has been output.

By this method, by outputting the set number of copies for each of documents on the document tray, all of the documents on the document tray are ejected, and if no document exists on the document tray (S410: NO), the copy process terminates.

According to the first embodiment, when the single copy mode is selected as the copy mode, a document image read in the scanner section 6 is stored in the buffer line-by-line and sequentially printed, so that a large amount of memory is not required and the copy-use storage area 14A is not used.

On the other hand, if multiple copy mode is selected, since a plurality of copies are created for one document, one whole page of read image data must be stored. Normally, to store image data for one page of A4 size at a resolution of 300 dpi, a capacity of about 1MB is required. Such a large amount of data could not be stored in the buffer even if compressed. Accordingly, the data must be stored in the copy-use storage area 14A of RAM 14.

However, if data for facsimile transmission is already stored in RAM 14, the copy-use storage area 14A of RAM 14 is reduced. In this case, for copying in the multiple copy mode, even if binary conversion by the error diffusion method is performed, as in the single copy mode, to create print-use data and the print-use data is compressed, the compression efficiency would be low and the compressed print-use data could not be stored in the copy-use storage area 14A.

Therefore, in the multiple copy mode, data is converted by simple binary conversion processing (S440) which provides high compression efficiency, rather than by the conversion method used in the single copy mode.

Thus, since a conversion type (i.e., simple binary conversion) which provides higher compression efficiency is used for a copy mode that requires more memory (i.e., the multiple copy mode), a situation in which memory shortage makes multiple copying impossible is avoided.

Conversely, in a copy mode requiring a small amount of memory (i.e, a single copy mode), a conversion type with low compression efficiency (i.e., binary conversion by the error diffusion method) is selected for conversion of image data into print-use data. Print-use data resulting from conversion of such a low compression efficiency conversion type generally produces copies of excellent image quality. Therefore, copies with high image quality could be obtained by selecting a single copy mode.

Second embodiment

Figure 7:
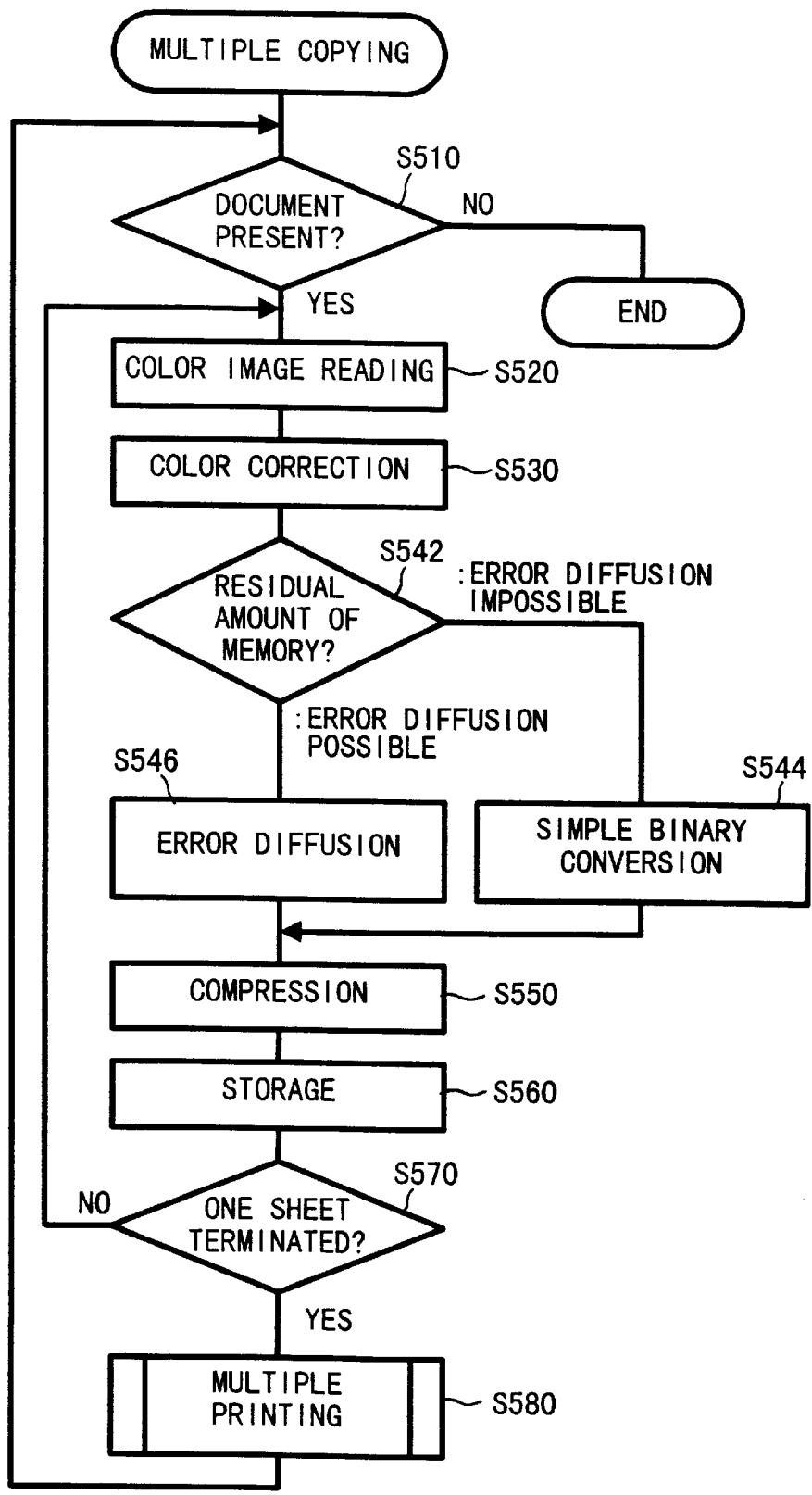
FIG. 7 is a flowchart showing multiple copy processing of the second embodiment.

The second embodiment is similar to the first embodiment, with the exception that processing in multiple copy mode is performed as shown in the flowchart of FIG. 7. Therefore, a detailed explanation is omitted.

Processing of steps S510, S520, and S530 in FIG. 7 are similar to steps S410, S420, and S430 in FIG. 5 of the first embodiment. However, when color correction processing in step S530 terminates, the residual amount of the copy-use storage area 14A is detected. The residual amount detection process is performed to determine whether a sufficient free space exists to store binary data resulting from the data conversion performed by the error diffusion method (S542).

If it is determined in step S542 that there is not a sufficient amount of memory to store binary data resulting from conversion by the error diffusion method, the same simple binary conversion process (S544) as that described above in step S440 is performed. If there is a sufficient amount of memory to store binary data resulting from conversion by the error diffusion method, the same binary conversion process using the error diffusion method as that described above in step S340 is performed (S546).

Once conversion into binary data is completed in step S544 or S546, the same process is performed in steps S550 to S570 as that in steps S450 to S470 of FIG. 5. When all of the image data on one sheet has been stored (S570: YES), multiple print processing (S580) is performed. The multiple print process, which is the same as that performed in the first embodiment (S480), is performed according to the flowchart shown in FIG. 6.

According to the second embodiment, even when the multiple copy mode is selected, if there is a large amount of residual memory, the error diffusion method which provides a small data compression effect is selected for conversion of image data into binary data. If there is a small amount of residual memory, the simple binary conversion processing which provides a large compression effect is selected for conversion of image data into binary data.

Accordingly, in the second embodiment, when the multiple copy mode is selected, if there is a sufficient amount of free memory, the error diffusion method is used for conversion of image data into binary data without binary data being obtained by the simple binary conversion process. Thus, even in the case of multiple copying, copies with excellent image quality can be output by making the most efficient use of memory.

Third embodiment

Figure 8:
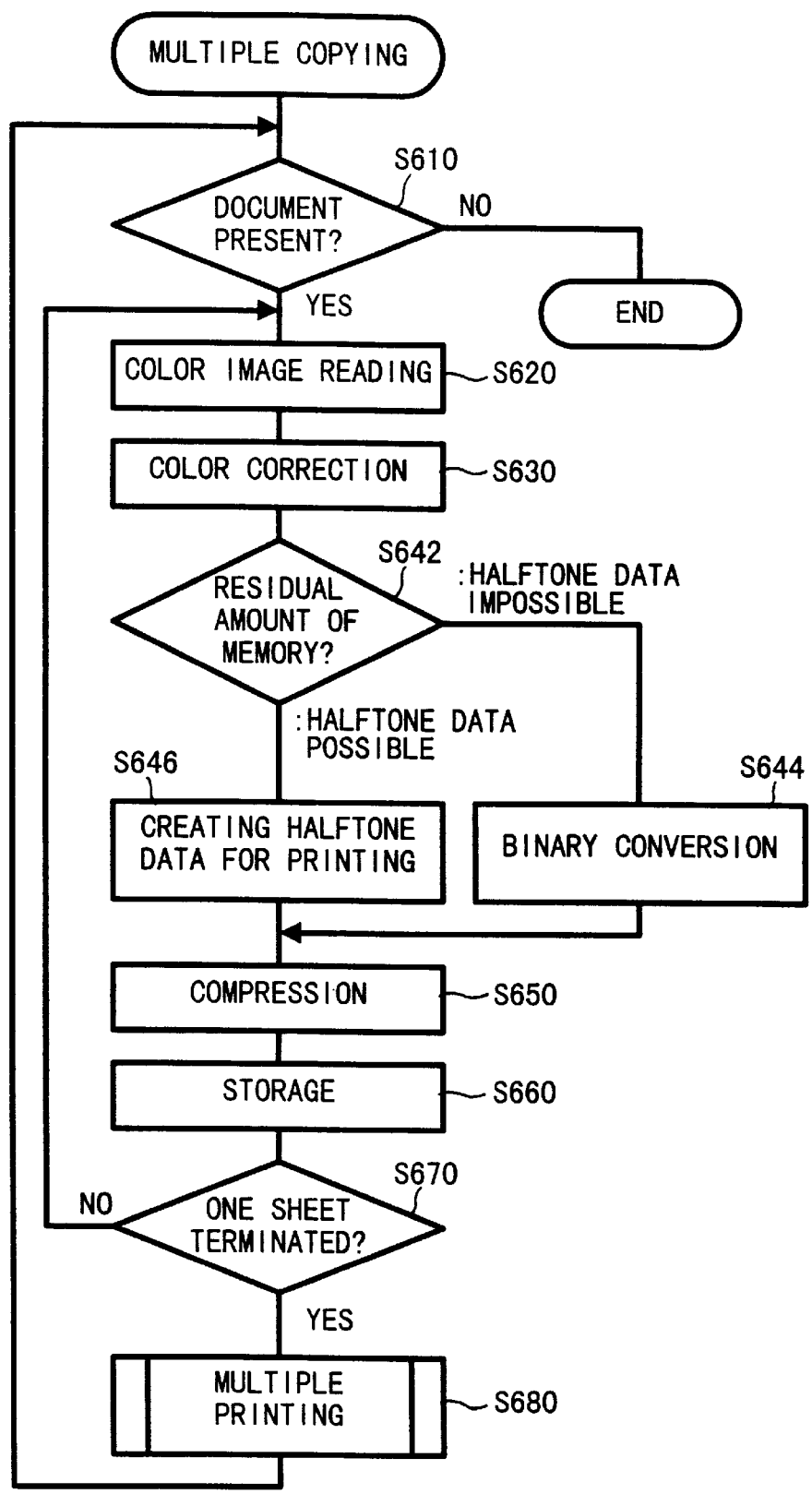
FIG. 8 is a flowchart showing multiple copy processing of the third embodiment.

The third embodiment is similar to the first embodiment, with the exception that the process for the multiple copy mode is performed as shown in FIG. 8. Therefore, a detailed explanation of the embodiment is omitted.

Steps S610, S620, and S630 in FIG. 8 are the same as that of steps S410, S420, and S430 in FIG. 5 of the first embodiment. However, when color correction process in step S630 terminates, the residual amount of the copy-use storage area 14A is detected. The process determines whether, if the image data of a document read by the scanner section 6 is converted into halftone data for printing, the copy-use storage area 14A has a sufficient amount of residual memory to store the halftone data (S642).

When it is determined that there is not an amount of memory sufficient to store the halftone data for printing, binary conversion processing (S644) is performed. However, if there is an amount of memory sufficient to store the halftone data for printing, a process for creating halftone data for printing is performed (S646).

Halftone data for printing is of a conversion type used in the so-called photo recording mode. When the recording section 8 is capable of not only printing by deposition and non-deposition of primary color inks, such as C (cyan), M (magenta), Y (yellow), and K (black), but also producing halftone colors, read data is converted by the scanner section 6. The halftone data for printing is larger than binary data because it contains concentration levels of halftones.

After conversion into print-use data is completed by step S644 or S646, the same process as that in steps S450 to S470 of the first embodiment is performed in steps S650 to S670.

When print-use data for one document sheet has been stored in the copy-use storage area 14A (S670: YES), multiple print processing (S680) is performed. The multiple print process (S680) is the same as that (S480) in the first embodiment.

According to the third embodiment, if the residual amount of the copy-use storage area 14A is large, print-use data is converted into halftone data. However, if the residual amount of the copy-use storage area 14A is small, print-use data is converted into binary data, the amount of which is smaller than that of halftone data.

Therefore, if the copy-use storage area 14A has a sufficient residual amount of memory, since printing is performed based on halftone data even in the case of the multiple copy mode, copies with excellent image quality can be output by making the most efficient use of memory.

As the binary conversion process performed in step S644, either simple binary conversion processing or binary conversion processing by the error diffusion method can be performed. Moreover, the third embodiment can be configured so that steps S542 to S546 in the second embodiment are performed as the binary conversion process in step S644. This permits selection of a more appropriate conversion type in accordance with the amount of free space in the copy-use storage area 14A.

Fourth embodiment

Figure 9:
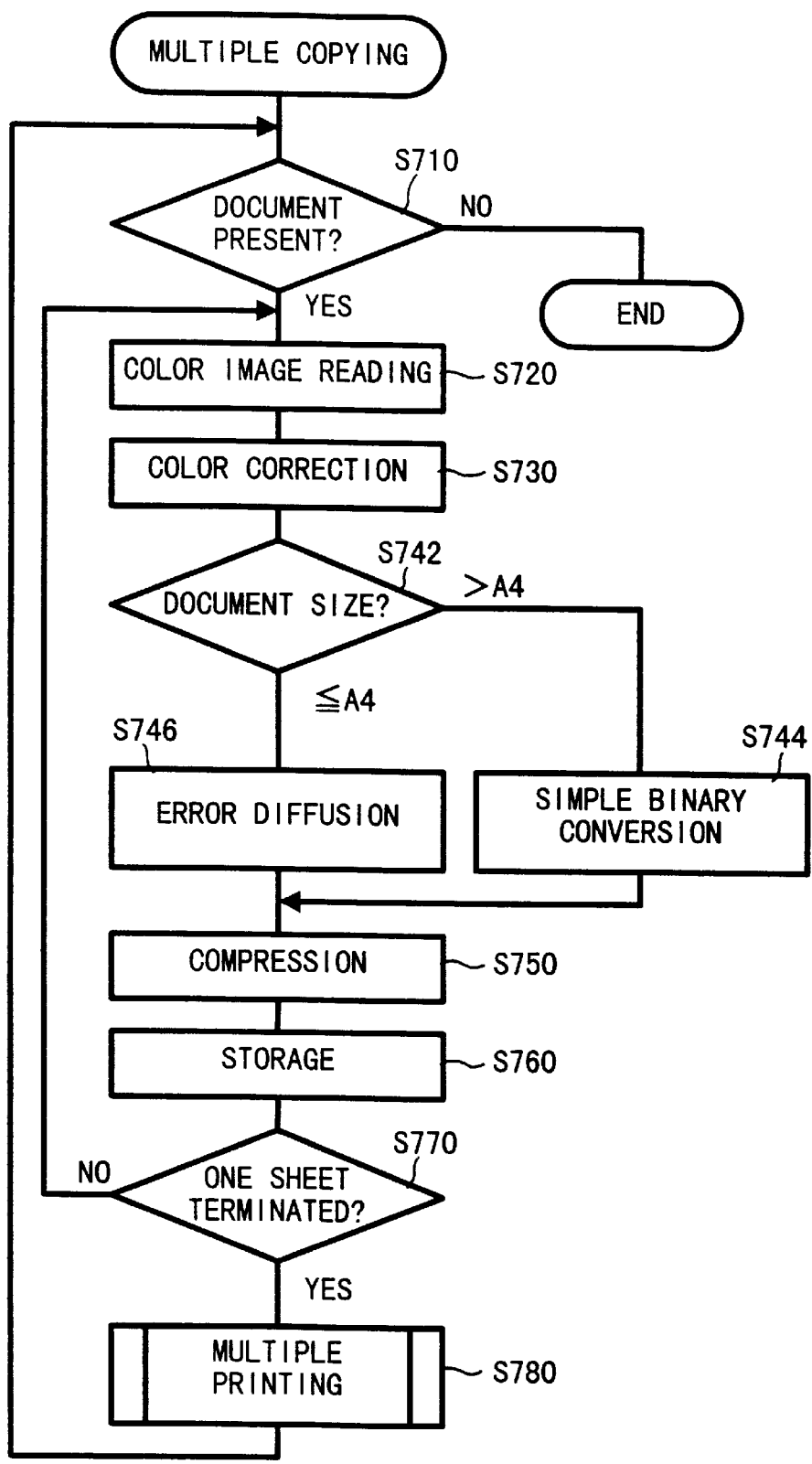
FIG. 9 is a flowchart showing multiple copy processing of the fourth embodiment.

The fourth embodiment is similar to the first embodiment, with the exception that the processing involved in the multiple copy mode is performed as shown in FIG. 9. Therefore, a detailed explanation is omitted.

Processing of steps S710, S720, and S730 in FIG. 9 is the same as that of steps S410, S420, and S430 shown in FIG. 5 of the first embodiment. However, when the color correction process in step S730 terminates, the size of a document on the document tray is determined (S742). In this step, the process determines whether the document size exceeds A4.

If the document size exceeds A4, the image data itself read by the scanner section 6 becomes large. If the image data were converted into binary data by the error diffusion method, the binary data might not be stored in the copy-use storage area 14A because of the low compression efficiency. Therefore, the read image data is converted by the same simple binary conversion processing (S744) as that in the step S544 in the second embodiment.

If the document size does not exceed A4, since the image data itself read by the scanner section 6 is small, binary data resulting from conversion by the error diffusion method is small enough to be stored in the copy-use storage area 14A, so that the same binary conversion processing by the error diffusion method as that in the step S546 of the second embodiment is performed (S746).

If conversion into binary data for printing is completed by step S744 or S746, the same process as that in the steps S450 to S470 of the first embodiment is performed in steps S750 to S770. In addition, when data of one sheet has been stored (S770: YES), multiple print processing (S780) is performed as the next step. The multiple print processing (S780) is the same as that (S480) in the first embodiment.

According to the fourth embodiment, when the multiple copy mode is set, if it can be determined that the amount of required memory is small because a document is small and the amount of data to be read is small, read image data is converted into binary data by the error diffusion method. This process ensures that copies with excellent image quality can be output by making the most efficient use of memory.

However, instead of the steps S744 and S746, steps S644 and S646 of the third embodiment can also be performed. Furthermore, steps S646 and S644 of the third embodiment can be executed instead of steps S340 and S440 of the first embodiment, respectively.

According to the first to fourth embodiments, either the single copy mode or the multiple copy mode can be selected on the operator panel 4. The multiple copy mode allows switching between conversion types in accordance with the amount of residual memory and document size. However, in the case of a copying apparatus having a printing function, once the image data of at least one sheet has been stored, switching between conversion types can be made in accordance with the residual amount of memory and document size regardless of the selected mode.

The multiple copy mode described above is the normal multiple copy mode in which more than one copy can be output for each document sheet. In addition to that mode, the multiple copy mode includes a sort copy mode in which, when a plurality of document sets comprising a plurality of sheets is copied, images are formed on recording media for each set.

Since the sort mode requires a still larger amount of memory, in order to perform the multiple copying described above, it is desirable to place severer limitations on the amount of residual memory and document size than in the normal multiple copy mode.

While this invention has been described in conjunction with specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. A copying apparatus comprising:
   an image data converter that reads image data from a document and converts the image data into print-use data;
   a command input device that enters commands for selecting a copy mode from a plurality of copy modes;
   an image copier that forms an image on a recording medium by using the print-use data; and
   a conversion-type selector that classifies the plurality of copy modes into a plurality of groups according to memory required for data storage by each copy mode, and selects a type of conversion to be used by the image data converter to convert image data into print-use data based on the group in which the copy mode entered by the command input device is found, wherein the conversion type is selected based on making the amount of the print-use data smaller for the copy mode groups requiring a large amount of memory.

2. The copying apparatus of claim 1, further comprising:
   a compression and storage device that compresses and stores print-use data that has been converted by the image data converter, if compression and storage of the print-use data are required.

3. The copying apparatus of claim 2, wherein the conversion-type selector identifies the group for the copy mode selected by the command input device and selects a conversion type which would provide a greater compression effect for the print-use data based on the group identified.

4. The copying apparatus of claim 3, further comprising:
   a residual memory amount detector that detects the amount of residual memory available in the compression and storage device for storing print-use data.

5. The copying apparatus of claim 4, wherein the conversion-type selector selects a conversion type which would provide a smaller compression effect if residual memory amount detector detects a large amount of residual memory available.

6. The copying apparatus of claim 1, further comprising:
   a residual memory amount detector that detects the amount of residual memory available for storing print-use data.

7. The copying apparatus of claim 6, wherein the conversion type selector selects a conversion type which makes the print-use data larger if the residual memory amount detector detects a large amount of residual memory available.

8. The copying apparatus according to claim 1, wherein the copy modes include a single copy mode in which the image copier forms an image on a recording medium once per document sheet by using the print-use data.

9. The copying apparatus according to claim 8, wherein the copy modes include a multiple copy mode in which the image copier forms an image on recording media more than once per document sheet by using the print-use data, the multiple-copy mode being included in the group requiring more memory than the group for the single copy mode.

10. The copying apparatus of claim 9, wherein the copy modes include a sort copy mode in which the image copier forms images on recording media for a plurality of document sets comprising a plurality of sheets using the print-use data.

11. The copying apparatus of claim 1, wherein the conversion types include a multivalue conversion type and a binary conversion type, the binary conversion type making the amount of data smaller than the multivalue conversion type.

12. The copying apparatus of claim 3, wherein the conversion types include a simple binary conversion type and a binary conversion type by halftone processing, the binary conversion type by halftone processing proving a smaller compression effect than the simple binary conversion type.

* * * * *